(12) United States Patent
Gandhi et al.

(10) Patent No.: US 11,227,483 B2
(45) Date of Patent: Jan. 18, 2022

(54) SYSTEM AND METHOD FOR TRANSMITTING AN ALERT FROM A WEARABLE DEVICE TO A USER NETWORK

(71) Applicant: KAHA PTE. LTD., Singapore (SG)

(72) Inventors: Pawan Gandhi, New Delhi (IN); Sudheendra Shantharam, Bengaluru (IN)

(*) Notice: Subject to any disclaimer, the term of this patent is extended or adjusted under 35 U.S.C. 154(b) by 0 days.

(21) Appl. No.: 16/630,476

(22) PCT Filed: Jul. 13, 2018

(86) PCT No.: PCT/SG2018/050349
§ 371 (c)(1),
(2) Date: Jan. 13, 2020

(87) PCT Pub. No.: WO2019/013713
PCT Pub. Date: Jan. 17, 2019

(65) Prior Publication Data
US 2021/0090426 A1    Mar. 25, 2021

(30) Foreign Application Priority Data

Jul. 13, 2017 (IN) .............................. 201741024772

(51) Int. Cl.
| | | |
|---|---|---|
| G08B 25/01 | (2006.01) | |
| G08B 25/00 | (2006.01) | |
| G08B 27/00 | (2006.01) | |

(52) U.S. Cl.
CPC ......... *G08B 25/016* (2013.01); *G08B 25/005* (2013.01); *G08B 27/005* (2013.01)

(58) Field of Classification Search
CPC .. G08B 25/016; G08B 27/005; G08B 25/005; G08B 25/10; H04M 1/72424; H04M 2250/02; H04M 2250/10; H04M 3/5116; H04W 4/029
See application file for complete search history.

(56) References Cited

U.S. PATENT DOCUMENTS

| | | | | |
|---|---|---|---|---|
| 2004/0227629 A1* | 11/2004 | Adamczyk | ............ | H04W 76/50 340/539.18 |
| 2008/0064375 A1* | 3/2008 | Gottlieb | ................. | H04W 4/90 455/414.1 |

(Continued)

FOREIGN PATENT DOCUMENTS

| | | |
|---|---|---|
| CN | 106658392 A | 5/2017 |
| RU | 2604858 C1 | 12/2016 |

*Primary Examiner* — Thomas S McCormack (57) ABSTRACT

The invention discloses a system and method for transmitting an alert from a wearable device to a user network. The wearable device includes a trigger to initiate a situation and a coupling device to couple the trigger to a notification system to notify the situation to a set of persons in the user network. The notification system allows the registration of the user, at least one guardian and the set of persons. The notification system generates a dependability score for each of the set of persons. The notification system also determines the current geo-location of the user, the guardian and the set of persons to determine a first group of trusted persons. The notification system transmits a first message to the first group of trusted persons and the guardian.

3 Claims, 7 Drawing Sheets

(56) References Cited

U.S. PATENT DOCUMENTS

| | | | |
|---|---|---|---|
| 2015/0003594 A1* | 1/2015 | Amerling | G06Q 10/10 |
| | | | 379/45 |
| 2015/0358794 A1* | 12/2015 | Nokhoudian | H04W 4/90 |
| | | | 455/404.1 |
| 2016/0037292 A1 | 2/2016 | King | |
| 2016/0071399 A1 | 3/2016 | Altman et al. | |
| 2017/0064529 A1 | 3/2017 | Lee et al. | |
| 2017/0243470 A1* | 8/2017 | Saynatmaki | G08B 25/016 |

\* cited by examiner

SYSTEM AND METHOD FOR TRANSMITTING AN ALERT FROM A WEARABLE DEVICE TO A USER NETWORK

The following specification particularly describes embodiments of the invention and the manner in which it is to be performed.

FIELD OF THE INVENTION

The present invention relates to the field of wearable devices. In particular, the invention relates to a wearable device and an alert notification system and method.

BACKGROUND OF THE INVENTION

There are many methods for enhancing people's personal safety during any situation for example a security emergency or a medical emergency. In some countries certain pre-defined phone numbers are used by people to contact the emergency service establishments not limited to hospital or police station. But in most of the developing countries the infrastructure is not equipped with means to support people who are in some inadvertent situation.

During an SOS, it is important that help from trusted individuals or organizations reach the person in distress as early as possible, especially in a situation when the person in distress (PID) is unable to use his or her phone. It could happen that one or more trusted and known individuals could be nearby, but will be unaware of the situation. Thus, though this person could be willing to help, there is no way he/she could be aware of the need.

The United States 2015/0332581 discloses a method and system for broadcasting a panic alert notification. It teaches a system that broadcasts a notification to all users proximate to the PID and who are registered by the PID or registered with the broadcasting system. However, the current panic alert notification systems may lead to the privacy of the PID is compromised, which in turn may pose a security threat or raise a social issue, as several people become aware of the present situation of the PID.

Therefore, there exists a need for a system and method to create a user network and to identify trusted persons near the user's geo-location and to alert such trusted persons.

SUMMARY OF THE INVENTION

In one embodiment, the present invention overcomes the problems of the existing systems by creating a user network and identifying trusted persons, by means of a wearable device coupled with a notification system, in a situation where the user may require assistance. According to an embodiment the present invention discloses a system and method for transmitting an alert from a wearable device to a user network. The wearable device includes a trigger to initiate a situation and a coupling device to couple the trigger to a notification system to notify the situation to a set of persons in a user network. The notification system includes a user registration module configured to register the user, at least one guardian and the set of persons in the user network. The set of persons are added from a contact list of the user or a contact list of the at least one guardian or a combination thereof. In one embodiment of the present invention, the notification system may also include a ranking module configured to generate a dependability score for each of the set of persons. In one embodiment of the present invention, the dependability score may be generated based on at least one of a user interaction or may be user defined or a combination thereof. In another embodiment of the present invention, the notification system includes a receiver module configured to receive and extract data related to the situation initiated by the user. In yet another embodiment of the present invention, the notification system further includes a dynamic location determination module configured to determine the current geo-location of the user, the at least one guardian and the set of persons. In some embodiments of the present invention, the notification system further includes a trusted person determination module coupled to the user registration module, the ranking module and the dynamic location determination module configured to determine a first group of trusted persons. Typically, the first group of trusted persons have their current geo-location within a predefined range and having the dependability score above a predefined value. In another embodiment of the present invention, the notification system includes an alert transmitting module coupled to the trusted person determination module to transmit a first message to the first group of trusted persons and the at least one guardian.

According to another embodiment, the trusted person determination module further generates a second group of trusted persons after a time lapse based on the current geo-location of the user and the second group of trusted persons and having the dependability score above a predefined value.

According to another embodiment, the notification system further includes a response monitoring module coupled to the alert transmitting module to receive a response from the first group of trusted persons and the second group of trusted persons, upon receiving the response, a second message to the first group of trusted persons, or the second group of trusted persons and the guardian.

According to yet another embodiment, the contact list includes at least one member selected from a contact list of mobile phone, a friends list of social network sites, any third-party applications or combinations thereof.

According to an embodiment the present invention discloses a method for creating a user network and transmitting an alert. The method includes the steps of creating the user network of set of persons and at least one guardian for a user, wherein the set of persons are added from a contact list of the user or a contact list of the at least one guardian or a combination thereof. The method also includes the step of generating a dependability score for each of the set of persons and initiating a situation using a trigger and receiving data related to the initiated situation. The method also includes determining a first group of trusted persons having their current geo-location within a predefined range and a dependability score above a predefined value and transmitting a first message to the first group of trusted persons and the at least one guardian.

According to another embodiment of the present invention, the method includes generating a second group of trusted persons after a time lapse based on the current geo-location of the user and the second group of trusted persons and having the dependability score above a predefined value. The method further includes transmitting a second message to at least one of the first group of trusted persons and the second group of trusted persons, upon receiving a response from at least one of the first group of trusted persons or the second group of trusted persons.

The present invention helps a user to raise a quick alarm notification to a network of users in a convenient manner as the alarm is initiated through a trigger from the wearable device, thereby avoiding delay in raising an SOS from the mobile device itself. The present invention further provides the ability to take help from a number of proximate trusted users form a large number of network of users. The set of persons in the user network may be person in the user contact list or the at least one guardian contact list (first level network), or may be added by the user or the at least one guardian, or are from an approved Organization/Company.

BRIEF DESCRIPTION OF THE DRAWINGS

The foregoing and other features of embodiments of the present invention, will become more apparent from the following detailed description of embodiments when read in conjunction with the accompanying drawings. In the drawings, like reference numerals refer to like elements.

DETAILED DESCRIPTION

In the following detailed description, reference is made to the accompanying drawings that form a part hereof, and in which shown by way of illustration specific embodiments that may be practiced. These embodiments are described in sufficient detail to enable a person skilled in the art to practice the invention, and it is to be understood that other embodiments may be utilized and that logical, mechanical, and other changes may be made within the scope of the embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. The singular forms "a," "an," and "the" include plural references unless the context clearly dictates otherwise. The following detailed description is, therefore, not be taken as limiting the scope of the invention, but instead the invention is to be defined by the appended claims.

The present invention overcomes the problems of the existing systems by creating a user network and identifying the trusted persons during any situation in which the user need assistance by means of a wearable device coupled with a notification system. The system and method may be implemented in a variety of computing systems. The computing systems that implements the described method(s) include, but are not limited to a server, a desktop personal computer, a notebook, a portable computer, hand-held devices, and a mainframe computer. Although the description herein is with reference to certain computing systems, the system and method may be implemented in other computing systems, though with a few variations, as will be understood by a person skilled in the art. Example embodiments of the working of the systems and methods for initiating and transmitting an alert to selected users of a user network is described in conjunction with FIGS. 1-5. It should be noted that the description and drawings merely illustrate the principles of the present subject matter. It will thus be appreciated that those skilled in the art will be able to envisage various arrangements that, although not explicitly described or shown herein, embody the principles of the present subject matter and are included within its spirit and scope.

Figure 1:
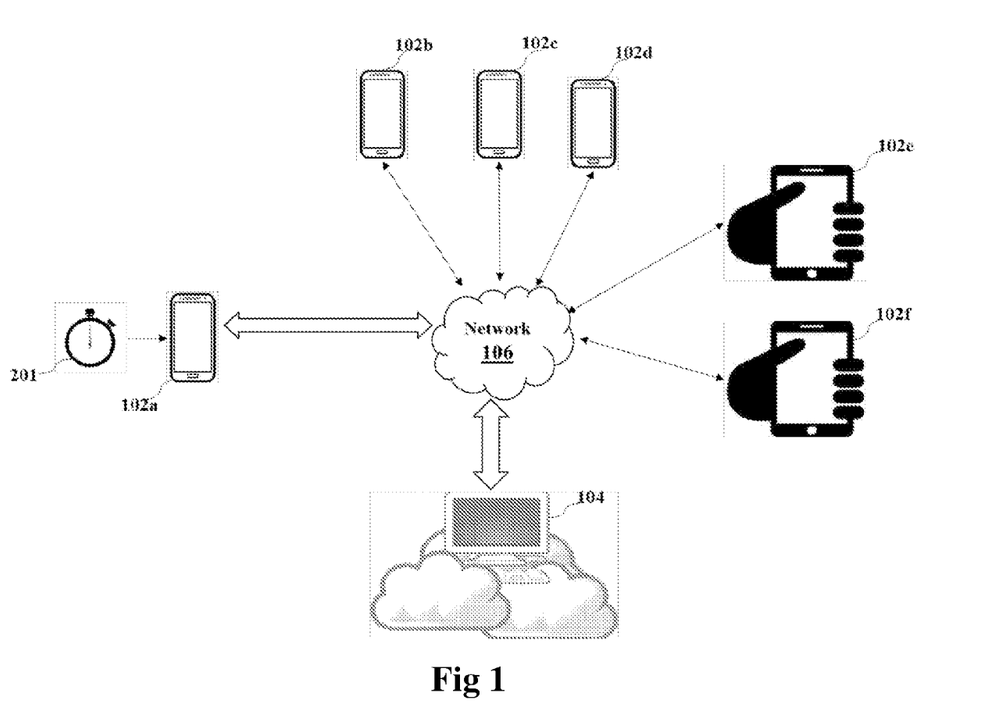
FIG. 1: illustrates an exemplary system network in which system and method consistent with the principles of the invention may be implemented, in accordance with an embodiment of the invention.

FIG. 1 illustrates an exemplary system network in which a system and a method consistent with the principles of the invention may be implemented. The network implementation include multiple client units, wherein the client unit is a piece of computer hardware or software that accesses a service made available by a server. For example the client units includes clients such as (102-a, 102-b, 102-c, 102-d, 102-e, 102-f . . . ) connected to at least one central server (104) via a network (106). The various client units (102-a, 102-b . . . ) and one central server (104) have been illustrated as connected to a network (106) as an example embodiment of the present invention. In another embodiment of the present invention may include multiple servers or client units. In some embodiments of the present invention, a client may perform the functions of a server and a server may perform the functions of a client. The client units (102) may include client entities wherein an entity may be defined as a device, such as a smart phone, wireless telephone, a personal digital assistant (PDA), laptop computer, a desktop computer, a notebook, a workstation, a mainframe computer, a server, a network server, and the like, or another type of computation or communication device, a thread or process running on one of these devices, and/or an object executable by one of these devices. In one implementation, the system may be implemented in a cloud-based environment. The central server (104) may include server entities that contain web based notification application and maintain central databases in a manner consistent with the principles of the invention. In an implementation consistent with the principles of the invention the central server (104) may include a data source (or set of data sources) containing information about various users, their guardians, set of persons for each user and their last updated location. For example, the data sources may include but is not limited to a relational database, object mapping database, xml data, document databases, NoSQL databases, Big Data supported columnar database such as HBase, or any data structure that supports Big Data.

In an implementation, the network (106) may be a communication network such as wireless network, a wired network or a combination thereof. The network (106) can be implemented as one of the different types of networks, such as intranet, local area network (LAN), wide area network (WAN), the internet, a telephone network, such as the Public Switched Telephone Network (PSTN), or a combination of networks and the like. The network (106) may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network (106) may include a variety of network devices, including routers, bridges, servers, computing devices, storage devices, and the like. The various client units (102) and the central server (104) may connect to the network (106) via wired, wireless, and/or optical connections. A "notification system," as the term is used herein, is to be broadly interpreted to include any machine-readable and machine-storable work product available via a network, such as network (106). The notification system may include, for example, a web site or standalone software which may be installed on a computing device and is connected to the central server (104) via the network (106).

According to an embodiment, the system and method may act as a panic notification application or an emergency notification application specifically for users who are in a panic situation or in an emergency situation. The notification application may be used in a situation where a user may need assistance from a specific group or a set of persons who are already registered with the system. The notification application transmits an alert to a group of trusted persons and the at least one guardian. In one embedment of the present invention, the group of trusted persons are selected based on their geographical proximity to the user who has initiated the situation. An example implementation of the system is described further in detail with reference to FIG. 2.

Figure 2:
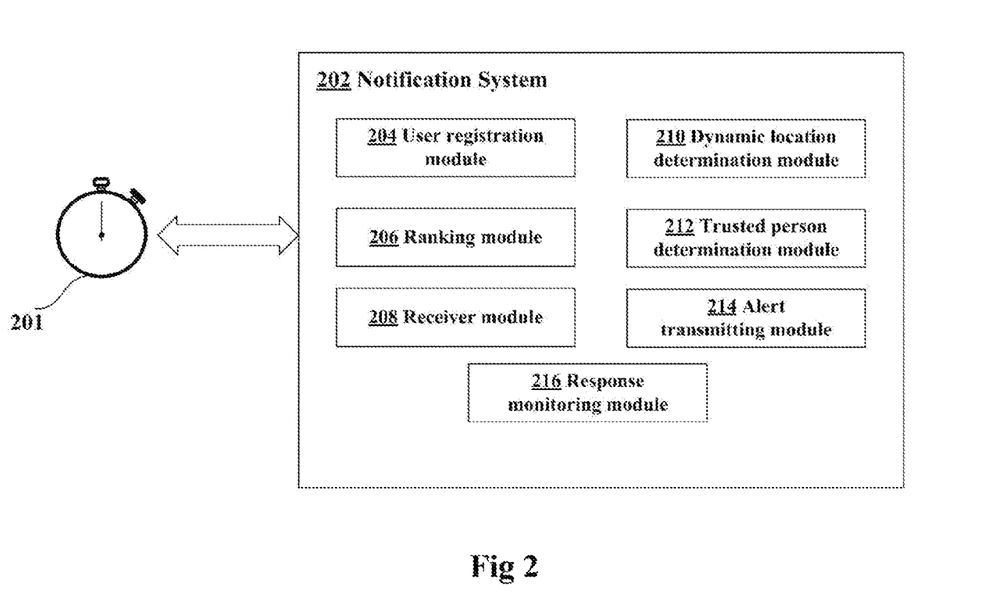
FIG. 2: illustrates a wearable device with a notification system, in accordance with an embodiment of the invention.

FIG. 2 illustrates a wearable device with a notification system, in accordance with an embodiment of the invention. FIG. 2 depicts a wearable device (201) for transmitting an alert to a network of users, which includes a trigger to initiate a situation. The wearable device (201) also includes a coupling device (not shown in the figure) to couple the trigger to a notification system (202) to notify the situation of the user to a set of persons in a user network. The notification system (202) includes a user registration module (204) configured to register the user, at least one guardian and the set of persons in the user network. The set of persons are added from at least one of a contact list of the user or a contact list of the at least one guardian. The notification system (202) also includes a ranking module (206) configured to generate a dependability score for each of the set of persons. The dependability score is generated based on at least one of a user interactions or is defined by the user or a combination thereof. The notification system (202) further includes a receiver module (208) configured to receive and extract data related to the situation initiated by the user. The notification system (202) also includes a dynamic location determination module (210) configured to determine the current geo-location of the user, the least one guardian and the set of persons. The location of all the users of the system is determined by the dynamic location determination module (210). The notification system (202) further has a trusted person determination module (212) coupled to the user registration module (204), the ranking module (206) and the dynamic location determination module (210) to determine a first group of trusted persons whose current geo-location is within a predefined range and having the dependability score above a predefined score. In one embodiment of the present invention, the at least one guardian may be defined as a person whom the user has complete trust, so that the user wants the system to alert the at least one guardian in case of any situation irrespective of their proximity to the geo-location of the situation initiated. The notification system (202) also includes an alert transmitting module (214) coupled to the trusted person determination module (212) to transmit a first message to the first group of trusted persons and the at least one guardian.

According to an embodiment, the trusted person determination module (212) further generates a second group of trusted persons after a time lapse based on the current geo-location of the user and the second group of trusted persons and having the dependability score above a predefined value. In one embodiment, the second group of trusted persons are selected employing the trusted person determination module (212) by considering the geo-location location of the set of persons after the time lapse. The first group of trusted persons and second group of trusted persons are commonly referred as trusted person herein after. The dynamic location determination module (212) tracks each and every user registered with the user registration module. This module updates the geo-location of each of the user in a server database. Thus, when the user initiates the situation, the geo-location of the user and the trusted person who has given an affirmative response to help the user are displayed to the at least one guardian. Thus enabling the guardian to track the user who has initiated the situation and ensure that the help would reach the user within a short time.

According to an embodiment of the present invention, the trusted person determination module (212) identifies trusted persons based on the following criteria as who are not currently registered with the notification system but has a high dependability score based on the user interaction and also has the current geo-location within the predefined range. The current location of the user is gathered from the social networking site of the persons. To the above identified trusted person a message may transmitted by the alert transmitting module (214) for example by employing an automated call such as IVR.

According to another embodiment, the notification system (202) further includes a response monitoring module (216) coupled to the alert transmitting module (214) to receive a response from the first group of trusted persons and the second group of trusted persons upon receiving the response a second message to the first group of trusted person, or the second group of trusted persons and the at least one guardian or combination thereof. It is envisaged that the system is capable to send third, fourth or subsequent messages to the trusted persons and the at least one guardian until the situation is closed or resolved. A situation is closed or resolved when the guardian or the person who has initiated the trigger or the trusted person who has reached the users geo-location confirms that the user is safe. The system allows the trusted persons, the at least one guardian and the user who has initiated the situation to have mutual communication until the situation is closed.

According to an embodiment, the first message sent to the first group of trusted persons includes only the message that a particular person is in some situation in a nearby location. In one embodiment of the present invention, the message may include only the name of the person who has initiated the situation. In another embodiment of the present invention, the geo-location of the user who has initiated the situation is shared with the trusted person. In yet another embodiment of the present invention, the geo-location of the user who has initiated the situation is shared to the trusted person who has responded affirmatively to the first message sent by the alert transmitting module (214). In one embodiment of the present invention, the action taken by the trusted person or the at least one guardian may be the content of the second message to enable faster and easier rescue. Typically, the action taken may be to call the police or travelling towards the geo-location from where the situation is initiated. In an embodiment of the present invention, the at least one guardian is always informed about the geo-location of the user who has initiated the situation and also the trusted persons who have responded affirmatively to help. In another embodiment of the present invention, the message to the trusted person may include a route map of the place to enable the trusted person to reach the user who has initiated the situation. In an example embodiment of the present invention, the message is sent to the trusted persons (includes first group and second group) and the at least one guardian by means of a SMS or an automated call or push message or email or a combination of any of these or it may be any communication technique available to inform the trusted person and the at least one guardian.

According to another embodiment, the geo-location of the user who has initiated the situation is shared with the trusted persons only as part of the second message. In an embodiment of the present invention, the first message may be a request to the trusted person to help the user who has initiated the situation. In an embodiment of the present invention, the first message may be sent as an interactive voice response (IVR) for which the trusted person agrees to help the user. In another embodiment of the present invention, when the first message to the trusted person is an IVR, then the at least one guardian is also informed about the response of the trusted person to the IVR.

According to an embodiment of the present invention, the addition of users to the user network by the user registration module (204) considers the persons present in the contact list of the user's mobile phone or smart phone. In another embodiment of the present invention, the persons may be considered from the contact list or friends list of the user's social networking sites. In another embodiment of the present invention, the addition of users to the user network by the user registration module (204) considers the persons present can be from the at least one guardian's contact list or the at least one guardian's friends list in social networking sites or the at least one guardian's or users contact's contact list. In an example embodiment of the present invention, the least one guardian's contacts and friends are added into trusted network of user automatically. This could continue to 'n' levels, wherein the degree of separation can be configured. Thus the user typically, has a trusted user network base of 100's or 1000's of persons, who are likely disturbed across the city and also has some degree of reliability based on the dependability score. The trusted persons in the network is known at least to the user or the at least one guardian or the user's contact or the at least one guardian's contact or user's contact's contact or the at least one guardian's contact's contact and so on, thereby developing the user's network. In another example embodiment, users may be added from a third-party application which has a number of persons related to the user. The third party application can be any sort of social media network platforms or any such platforms that connects people in a locality. It is possible to add the emergency contacts such as police, ambulance or any such numbers to the user network with a high dependability score.

According to an embodiment, the at least one guardian or the trusted person list includes the police contact number or emergency contact number. So that the system sends alert messages to them based on the circumstances. The circumstances include a scenario in which communication to the at least one guardian are not getting established or there are no trusted person in the user network within the predefined range of distance or dependability score.

According to an embodiment, the user registration module (204) acquires the permissions required to access the social networking sites of the user on behalf of the user for generating dependability score for each contact or friend of the user with respect to the user. Based on the interaction of the user with the friends in the social networking site the dependability score for each of the friends in the contact list may be determined. In an embodiment of the present invention, the dependability score is generated based on a call log or message analysis of the user. In an example embodiment of the present invention, text data analysis may be carried out to determine the dependability score for the user. In another embodiment of the present invention, the text data analysis may be based on the textual data exchange or interactions between the user and the person. In another embodiment of the present invention, the user may provide the dependability score for each person added to his user network.

In another embodiment, the dependability score may be provided by the user who is adding his set of person as either highly dependable or dependable or neutral or non-dependable. Generally, the non-dependable scored users are excluded while generating first group of trusted persons and second group of trusted persons even if they have a higher dependability score from other users. This helps in maintaining an exclusion list of users for each user. The existence of exclusion list is useful when certain user considers that the knowledge of his particular situation is detrimental for his own safety.

According to another embodiment, to determine a first group of trusted persons and second group of trusted persons for a user, the trusted person determination module (212) considers the current geo-location of the set of person in the user's user network. The selection of trusted persons is done based on their proximity to the geo-location of the user who has initiated a situation. The distance to consider the proximity of the user may vary based on each initiation of situation. In an example embodiment of the present invention, for selecting the first set of trusted person the distance considered may be about 3 km from the geo-location of the situation initiated, if the trusted person determination module (212) doesn't find any user from the set of persons in the user network, then the predefined distance is changed accordingly. In another example embodiment of the present invention, the first set of trusted persons may be selected based not only on the proximity but also based on the time required to reach the location of the user who has initiated the situation, so that the persons who need shortest time to reach the geo-location of the user who has initiated the situation get selected over the others. Hence, the criteria considered in such scenario is the expected time required for each user in the set of persons to each the geo-location of the user who has initiated the situation apart from the proximity of the persons in the user network. The trusted person determination module (212) also considers the dependability score of the set of persons in the user network along with the geo-location for selecting the trusted persons.

According to an embodiment the wearable device may be a wrist band or a wrist watch or a jewellery such as ring or a pendant with a coupling mean to couple to a notification system. The above mentioned wearable devices includes a trigger to initiate a situation or SOS, through which the SOS is raised in quick and convenient manner. The trigger is in communication with the notification system (202) to receive the information about the initiation of the situation or SOS. The notification system (202) may exist in the wearable device itself or may be in communication with a smartphone or any computing device present in the vicinity of the wearing person. The communication may be Bluetooth or Zigbee or any such low energy communication technology. For example, the user's mobile phone may be paired to the wearable device. The user's mobile phone includes the notification system. The notification system may be installed as an application and also preconfigures a set of guardians who receives the SOS message, in case of emergencies. In certain scenario, the trigger is part of a wearable devices. In certain scenario the trigger may be a part of the user device itself.

Non-limiting examples of the situation initiated includes a medical emergency situation, or a panic situation, or a security threat, or an emergency situation inside an area (for example an industrial area, work place, public place or at home). In one embodiment of the present invention, details of the situation initiated such as danger level information—how critical the danger is, or whether the user is moving, provide information on number of perpetrators, whether perpetrators are known persons etc, may be provided. For example, long press of the trigger may be an indication of a critical emergency. Whereas, when such long press is followed by another sequence of short press, the sequence of short press may be an indication of the number of perpetrators. For example, the pressing of button for three times indicate that there are three perpetrators.

According to an embodiment, the geo-location of user and the set of persons in the user network gets updated and stored in a database continuously. The current geo-location is the geo-location of the user at that particular point of time. In an embodiment of the present invention, the process of identifying the trusted persons may happen in the server application. In another embodiment of the present invention, the process of identifying the trusted persons may occur in the user device itself.

Figure 3:
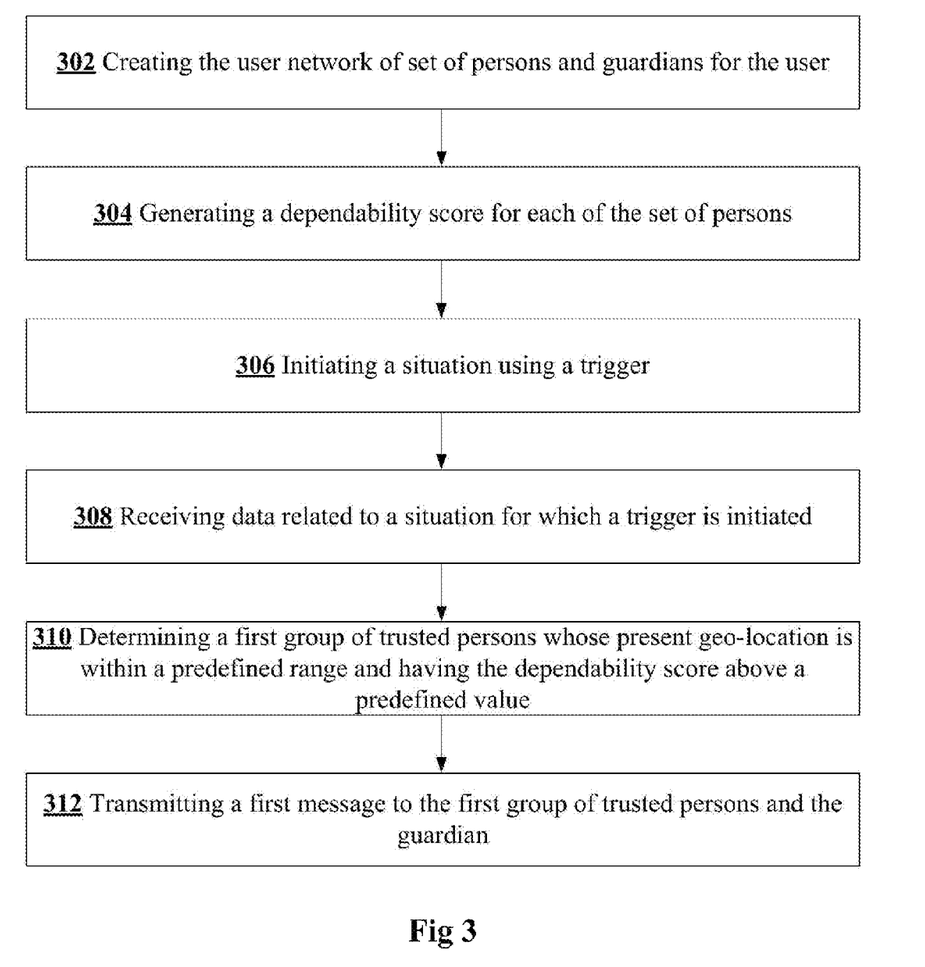
FIG. 3: illustrates the block diagram of the method for creating a user network for each user and transmitting an alert, in accordance with an embodiment of the invention.

FIG. 3 illustrates the block diagram of the method for creating a user network for each user and transmitting an alert, in accordance with an embodiment of the invention. The method (300) may be described in general context of computer executable instructions. The computer executable instructions may include but not limited to programs, routines, procedures, modules, functions, data structures and the like, which perform particular functions or implement particular abstract data types.

At block (302), a user network is created for each of the user. In an embodiment, each user by means of their user device (102) registers with the system. During registration the user creates a set of persons and guardians. The set of persons are added from at least one of a contact list of the user or a contact list of the guardian. The step of creating the user network is executed by the user registration module (204) by means of processor (220). The data related to this step gets stored in the memory (228).

At block (304), a dependability score for each of the set of persons gets generated. The dependability score is generated based on at least one of a user interactions or is user defined. In an embodiment, ranking module (206) facilitate the generation of the dependability score. The data related to this step gets stored in the memory (228).

At block (306), a situation get initiated using a trigger. In an embodiment, the trigger is part of a wearable device and is coupled with the notification system.

At block (308), receiving data related to the situation for which the trigger is initiated. The data includes information related to the user, the situation and the current geo-location of the user who has initiated the situation data are processed. In an embodiment, receiver module (208) along with dynamic location determination module (210) helps in processing the received data to determine the present-geo-location.

At block (310), a first group of trusted persons to be notified of the situation of the user from the set of persons in the user network is determined. In an embodiment of the present invention, a trusted person determination module (212) coupled to the user registration module (204), the ranking module (206) and the dynamic location determination module (210) is configured to determine a first group of trusted persons whose current geo-location is within a predefined range and having the dependability score above a predefined dependability score.

At block (312), a first message is transmitted to the guardians and the first group of trusted persons. In another embodiment of the present invention, an alert transmitting module (214) coupled to the trusted person determination module (212) is configured to and transmit a message to be send to the trusted persons. In one scenario, the alert transmitting module (214) may format the message before transmitting the same.

According to an embodiment, the method (300) also includes generating a second group of trusted persons after a time lapse based on the current geo-location of the user and the second group of trusted persons. The method also includes transmitting a second message to at least one of the first group of trusted persons and the second group of trusted persons. The second message is sent after receiving a response from at least one of the first group of trusted persons or the second group of trusted persons. In an example embodiment, the second message may include current geo-location of the user.

The order in which the method (300) is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

Figure 4:
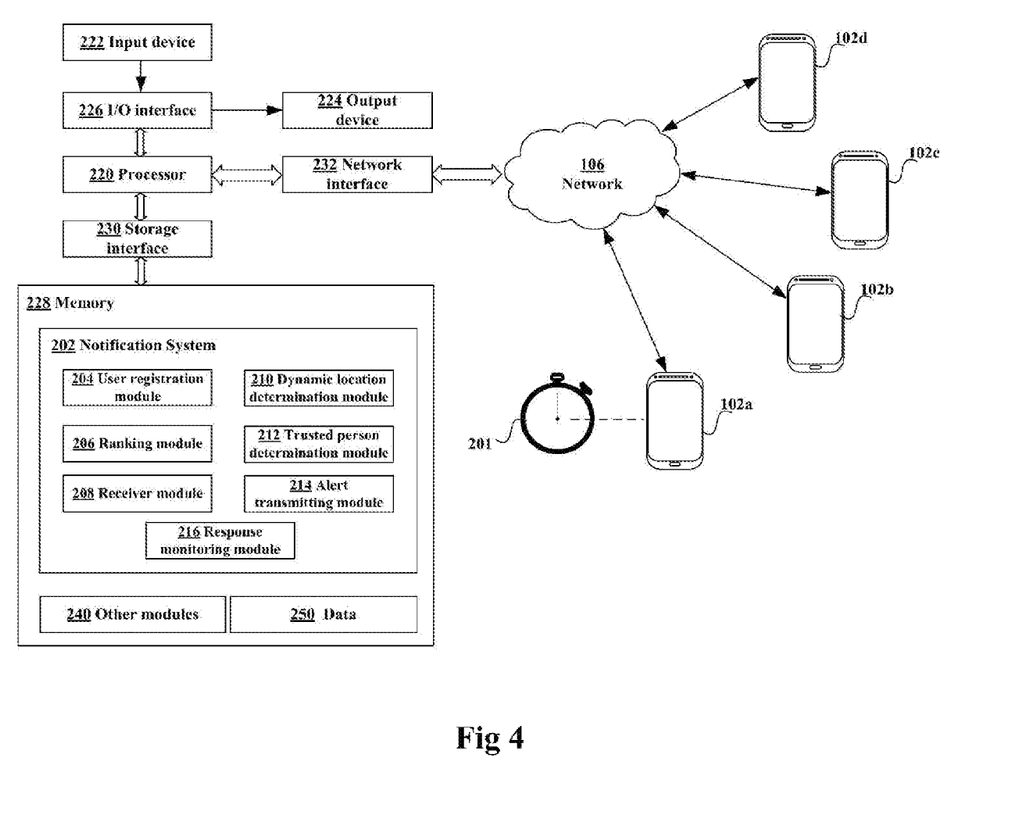
FIG. 4: illustrates an exemplary computer system for implementing embodiments persistent with present invention, in accordance with an embodiment of the invention.

FIG. 4 illustrates an exemplary computer system for implementing embodiments persistent with present invention. As shown in FIG. 4 the notification system may include at least one processor (220) also known as central processing unit or cpu for executing program components of various modules present in the notification system (202). The notification system also includes at least one input device (222) and at least one output device (224). The input device (222) and output device (224) communicates to the processor through I/O interface (226). The notification system further has memory (228) communicates to the processor by means of storage interface (230). The processor (220) may be implemented as one or more microprocessors, microcomputers, microcontrollers, digital signal processors, central processing units, state machines, logic circuitries, and/or any devices that manipulate signals based on operational instructions. The processor (220) is configured to fetch and execute computer-readable instructions stored in the memory (228) apart from other capabilities.

The I/O interface (226) includes at least one software and hardware interfaces by employing communication protocols. According to an embodiment of the present invention, the input device or the output device may be an user device (102) such as the user device (102a), (102b), (102c) and (102d) which communicates to the processor module over the network (106) by means of a network interface (232). The network interface (232) utilizes at least one of various connection protocols and methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), HighSpeed Packet Access (HSPA+), Global System For Mobile Communications (GSM), LongTerm Evolution (LTE), WiMax, or the like), etc. This enables the notification system (202) to communicate with other computing devices, such as web servers and external data servers.

In another embodiment of the present invention, the I/O interface (226) may be a web interface, a graphical user interface, and the like. The I/O interface (226) may allow the notification system (202) to interact with a user directly or through the user device (102). The I/O interface (226) may include one or more ports for connecting a number of devices to one another or to another server.

The memory (228) may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The storage interface (230) may connect to memory (228) by employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc. The memory (228) also includes the various modules, data bases for storing the data. The various modules include user registration module (204), ranking module (206), receiver module (208), dynamic location determination module (210), trusted person determination module (212), alert transmitting module (214), response monitoring module (216), and other modules (240). The other modules (240) includes without limitation, an operating system, web server, user interface application, mail server etc. The data related to the notification system (202) as well as the other modules are stored data (250). The data (250) may be stored as database. The database may be implemented as fault-tolerant, relational, scalable, secure databases such as Oracle or Sybase.

According to one embodiment of the present invention, a user may use the user device (102) to access the system (202) via the I/O interface (226) by utilizing the network interface (236). The user may register themselves using the VO interface (226) in order to use the system (202). The working of the system (202) using the plurality of modules are already explained in detailed.

According to another embodiment of the present invention, the wearable device (201) itself includes the processor (220) and the memory (228) to process and access the data (250) stored in the server. In an example embodiment of the present invention, the processor and memory may be included in a user device such as smart phone or a personal computing devices such as laptop, tablet, and desktop and so on In another example embodiment of the present invention, the processor may be with any smart device with a communication facility, which is in communication with the wearable device as the smart device may be any IOT device in a network.

Figure 5:
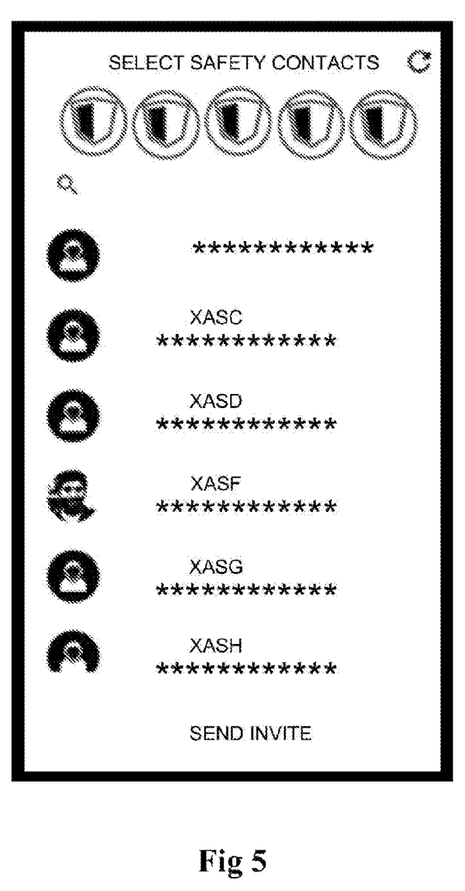
FIGS. 5-11 illustrate a number user interfaces of the system and method, in accordance with an embodiment of the invention.

FIGS. 5-11 illustrate a number of user interfaces of the system and method, in accordance with an embodiment of the invention. The user interfaces are by way of illustration only. FIG. 5 illustrates an exemplary interface for adding set of persons (or safety contact) into a user network from the contact list of the user. The safety contact includes both guardians and also the set of persons in the user network. A user interface similar to the interface shown in the FIG. 5 is used to add the at least one guardian's contacts. Once the user adds a guardian or a safety contact, then the system sends an invitation message to those users requesting them to be user's guardian or safety contact. Similarly, each of the at least one guardian or set of person can add his or her contact as safety contact for the user. The user may be able to see a status which illustrates whether the user's request is accepted by the safety contacts and the at least one guardian. In yet another embodiment of the present invention, in the event that any of the contacts has not accepted the user's request there is a provision to resend the invitation to such user's at least one guardian. In one embodiment of the present invention, the users are also provided with an option to define the dependability score for each contact while adding them to the user network. The dependability score helps in identifying the block list of persons for the user.

Figure 6:
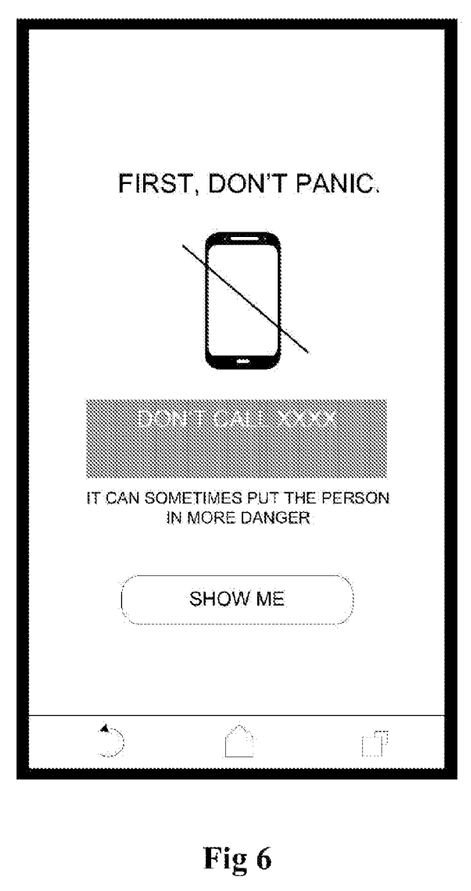
Figure 7:
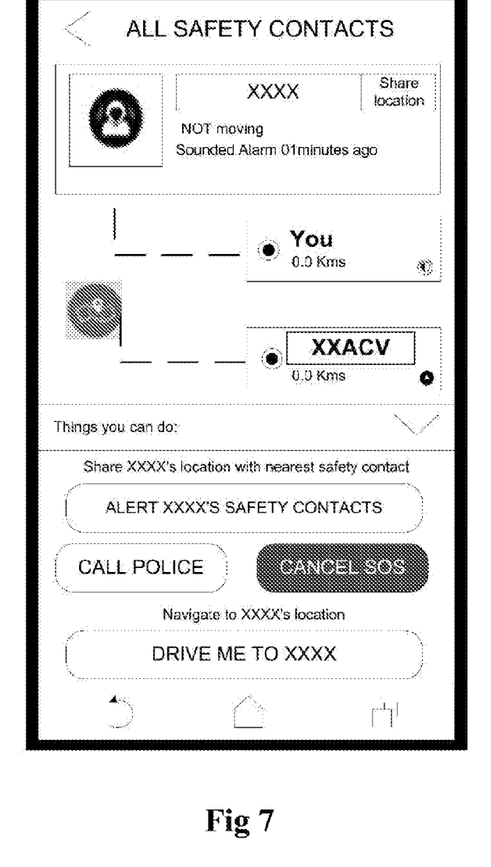
Figure 8:
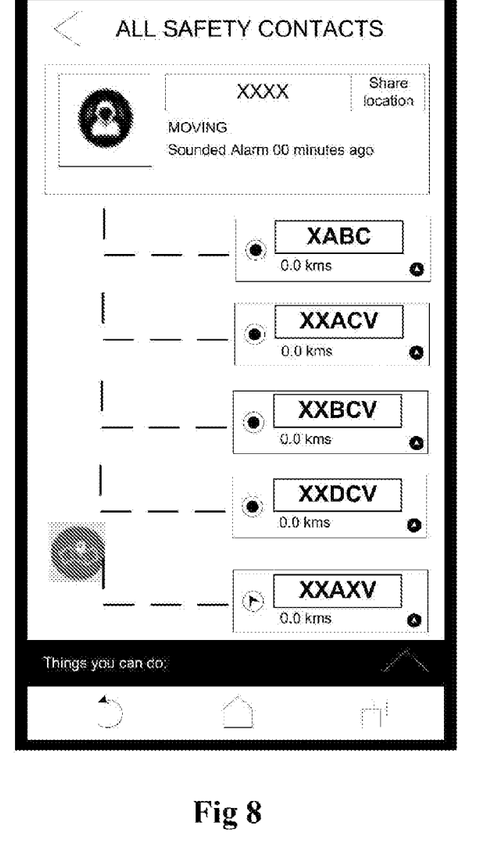
Figure 9:
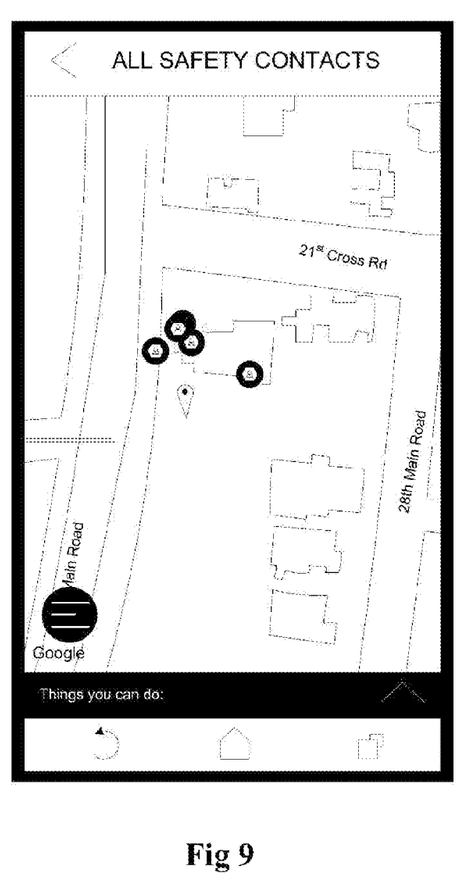
Figure 10:
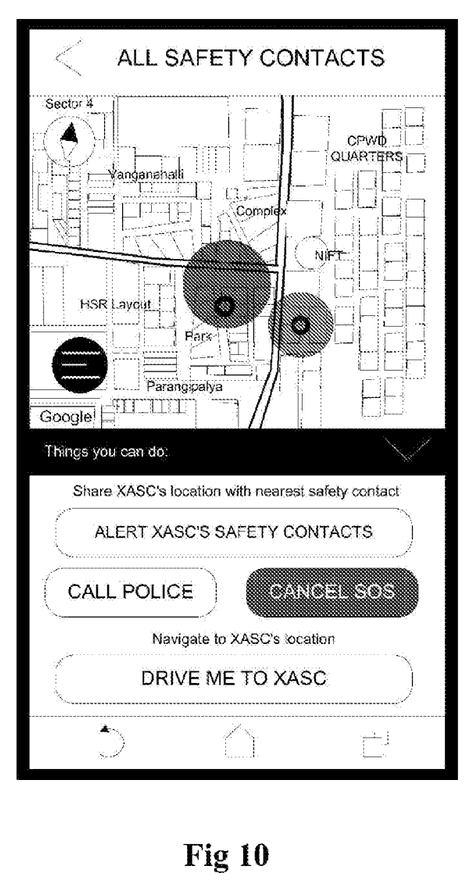
Figure 11:
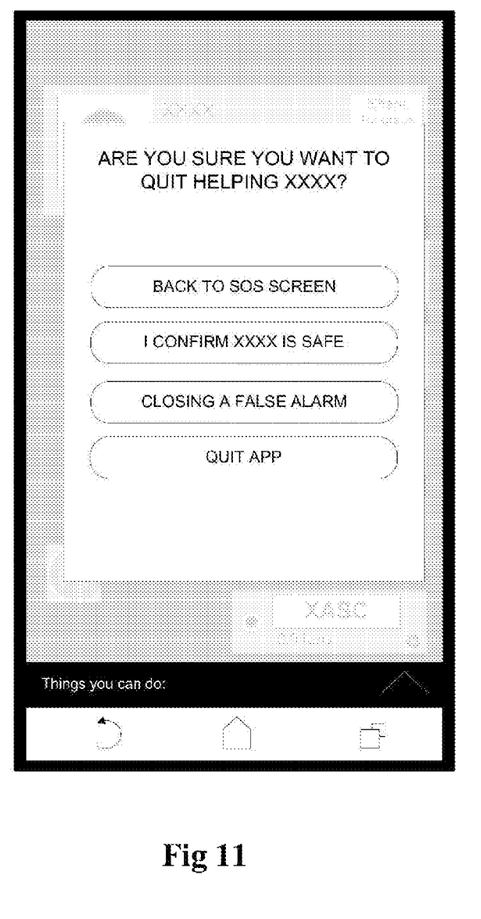

According to an embodiment, when a user triggers a situation an alert message is sent to the guardian along with the block list or non-dependable people list. An illustrative alert message received by a guardian during a panic situation is illustrated in FIG. 6 in accordance to an embodiment of the invention. It may give a message as illustrated in FIG. 6 requesting the guardian not to call the user who has initiated the situation as a call may put the user in a more dangerous situation. The system shows the photograph of the user who has initiated the situation along with the suggested steps to perform is illustrated in FIG. 7. The at least one guardian is also illustrated with the user and the proximate safety contacts as illustrated in FIG. 7. The at least one guardian also has the facility to see the location of the user and the proximate safety contact as illustrated in FIG. 8 or FIG. 9 either as a list of safety contact with their respective distance from the user or as map of safety contacts pinned on a route map respectively. Here the user as well as the proximate safety contacts are pinned to their last known location which is used to determine their proximity to the user. FIG. 10 illustrates a user interface which allows the guardians to share the location of the user who has initiated the situation to his proximate safety contact. In an example embodiment of the present invention, selection of the safety contact to whom the location is shared may also be done by the system itself or it is also possible to be done by the user's at least one guardian. FIG. 11 illustrates a sample user interface providing various options to the at least one guardian or safety contact after they receive the alert message from the user who has initiated the situation. This user interface provides options such as an option to update about the user's safety or in case of false alarm closing the same or exit the application.

The present invention helps a user to raise a quick alarm notification to a trusted network of person in a convenient manner as the alarm is initiated through a trigger from the wearable device. This avoids the time consuming step of raising an SOS from the mobile device itself. The present invention provides the ability to take help from a number of proximate trusted persons form a large number of network of users. All the persons in the user network of the user are his/her trusted persons, either they are added by the user, or they are the at least one guardian's first level network or they are from an approved Organization/Company. In an embodiment of the present invention, the non-trusted person may not be able to enter into a persons' network. It further has the ability to find current geo-location of person who raised the alert and also track the movement when the PID is moving. The present invention is applicable in SOS Emergency scenarios like Child Safety, Women Safety, Senior Citizen Safety, Senior Citizen Health etc. The present invention works is envisaged even to implement easily in non-emergency situations such as finding and seeking help from trusted persons nearby. The capability of the present invention to automatically track location will help in providing help quickly and efficiently.

The foregoing description of the preferred embodiment of the present invention has been presented for the purpose of illustration and description. It is not intended to be exhaustive or to limit the invention to the precise form disclosed. Furthermore, all examples recited herein are principally intended expressly to be only for pedagogical purposes to aid the reader in understanding the principles of the present subject matter and are to be construed as being without limitation to such specifically recited examples and conditions. Many modifications and variations are possible in light of the above teachings. It is intended that the scope of the present invention not be limited by this detailed description

We claim:

1. A wearable device for transmitting an alert, wherein the wearable device comprises:
   a trigger to initiate a situation and a notification system (202);
   a coupling device to couple the trigger to the notification system (202) to notify the situation to a set of persons in a user network, wherein the notification system comprises:
      a user registration module (204) configured to register a user, at least one guardian and the set of persons in the user network, wherein the set of persons are added from a contact list of the user or a contact list of the guardian or a combination thereof;
      a ranking module (206) configured to generate a dependability score for each of the set of persons, wherein the dependability score is generated based on a user interactions;
      a receiver module (208) configured to receive and extract data related to the situation;
      a dynamic location determination module (210) configured to determine the current geo-location of the user, the guardian and the set of persons;
      a trusted person determination module (212) coupled to the user registration module (204), the ranking module (206) and the dynamic location determination module (210), configured to determine a first group of trusted persons whose current geo-location is within a predefined range and having the dependability score above a predefined value;
   an alert transmitting module (214) coupled to the trusted person determination module (212) to transmit a first message to the first group of trusted persons and the guardian,
   wherein the trusted person determination module (212) further generates a second group of trusted persons after a time lapse, based on the current geo-location of the user and the second group of trusted persons and having the dependability score above a predefined value wherein the notification system (202) further comprises a response monitoring module (216) coupled to the alert transmitting module (214) to receive at least one response from the first group of trusted persons and the second group of trusted persons, upon receiving the response a second message is transmitted to the first group of trusted person, or the second group of trusted person and the guardian, wherein when the user initiates a situation, the current geo-location of the user and the trusted person who has given an affirmative response to help the user are displayed to the at least one guardian, and wherein selection of trusted persons is done based on their dependability score, proximity to the current geo-location of the user who has initiated a situation and time required to reach the location of the user who has initiated the situation.

2. The system as claimed in claim 1, wherein the contact list includes at least one of a contact list of mobile phone, a friends list of social network sites or any other third-party applications.

3. A method for creating a user network and transmitting an alert, said method comprises the steps of:
   creating the user network of set of persons and guardians for a user, wherein the set of persons are added from a contact list of the user or a contact list of the guardian or a combination thereof;
   generating a dependability score for each of the set of persons;
   initiating a situation using a trigger;
   receiving data related to the initiated situation;
   determining a first group of trusted persons whose current geo-location is within a predefined range and having the dependability score above a predefined value; and
   transmitting a first message to the first group of trusted persons and the guardian,
   generating a second group of trusted persons after a time lapse based on the current geo-location of the user and the second group of trusted persons and having the dependability score above a predefined value;
   receiving at least one response from the first group of trusted persons and the second group of trusted persons, upon receiving the response a second message is transmitted to the first group of trusted person, or the second group of trusted person and the guardian, wherein when the user initiates a situation, the current geo-location of the user and the trusted person who has given an affirmative response to help the user are displayed to the at least one guardian, and wherein selection of trusted persons is done based on their dependability score, proximity to the current geo-location of the user who has initiated a situation and time required to reach the location of the user who has initiated the situation.

* * * * *